United States Patent Office 3,057,887
Patented Oct. 9, 1962

3,057,887
NOVEL Δ¹,⁴-ANDROSTADIENES AND PREPARATION THEREOF
Gerard Nominé, Noisy-le-Sec, Robert Bucourt, Villiers-le-Bel, and André Pierdet, Noisy-le-Sec, France, assignors, by mesne assignments, to Roussel-UCLAF, S.A., Paris, France, a corporation of France
No Drawing. Filed Feb. 7, 1961, Ser. No. 87,542
Claims priority, application France Feb. 10, 1960
9 Claims. (Cl. 260—397.45)

This invention relates to novel Δ¹,⁴-androstadienes having the formula

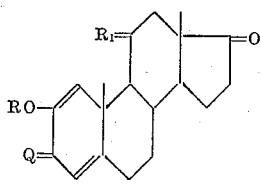

wherein Q is selected from the group consisting of oxo, lower ketals, semicarbazido and hydrazino, R is selected from the group consisting of hydrogen and lower alkyl and R₁ is selected from the group consisting of oxo and

The invention further relates to a process for the preparation of said Δ¹,⁴-androstadienes and novel intermediates formed therein. The novel Δ¹,⁴-androstadienes have a pronounced antilipemic activity and are also useful as intermediates for the preparation of other steroids.

It is an object of the invention to obtain novel Δ¹,⁴-androstadienes which posses antilipemic activity, particularly 2-methoxy-Δ¹,⁴-androstadiene-11β-ol-3,17-dione.

It is a further object of the invention to obtain novel intermediates for Δ¹,⁴-androstadienes and particularly Δ⁴-androstene-1,2,11β-triol-3,17-dione.

It is another object of the invention to provide a novel process for the preparation of novel Δ¹,⁴-androstadienes.

These and other objects and advantages of the invention will become obvious from the following detailed description.

The process of the invention comprises oxidizing a compound having the formula

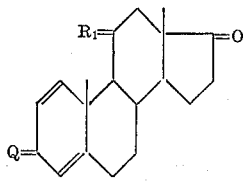

to form a compound having the formula

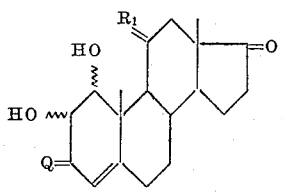

dehydrating the latter to form a compound having the formula

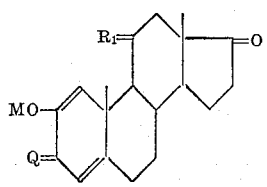

wherein M is an alkali metal, and alkylating the latter with an alkyl halide to form a compound having the formula

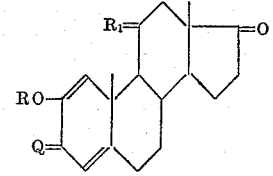

wherein R, R₁ and Q have the above definitions.

The preferred process of the invention comprises oxidizing Δ¹,⁴-androstadiene-11β-ol-3,17-dione to form Δ⁴-androstene-1,2,11β-triole-3,17-dione, dehydrating said Δ⁴-androstene to form an alkali metal enolate of Δ¹,⁴-androstadiene-2,11β-diol-3,17-dione and alkylating the latter to form 2-lower alkoxy-Δ¹,⁴-androstadiene-11β-ol-3,17-dione and preferably 2-methoxy-Δ¹,⁴-androstadiene-11β-ol-3,17-dione. The oxidation may be effected with any oxidant which attacks a double bond such as osmium tetraoxide in pyridine at room temperature, the dehydration may be effected with an alkali metal lower alkanolate in a lower alkanol at reflux temperatures such as sodium methylate in methanol and the alkylation may be effected with a lower alkyl halide such as methyl iodide in an acetone solution at reflux temperatures. The preferred process is illustrated on Table I.

TABLE I

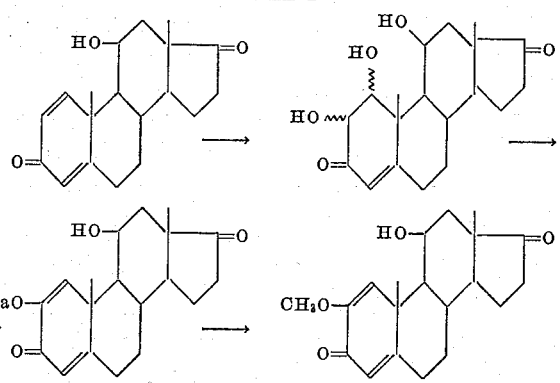

The process of the invention may be carried out with other starting Δ¹,⁴-androstadiene-17-ones in which there is an 11-oxo group and/or a ketal, semicarbazido or hydrazido group in the 3-position as they are not affected by the reaction conditions.

If desired, 2-lower alkoxy-Δ¹,⁴-androstadiene-11β-ol-3,17-dione may be further reacted to form the other compounds. The 11β-hydroxy group is readily oxidized to the 11-oxo group and the 3-one group can be readily transformed to the corresponding ketals, semicarbazido or hydrazido by well known methods.

In the following example there are described several preferred embodiments to illustrate the invention. However, it should be understood that the invention is not intended to be limited to the specific embodiments.

EXAMPLE

*Preparation of 2-Methoxy-Δ¹,⁴-Androstadiene-11β-ol-3,17-Dione*

Step A—*Preparation of Δ⁴-androstene-1,211β-triol-3,17-dione.*—0.826 gm. of osmium tetraoxide were dissolved in 4 cc. of pyridine at a temperature between about 0 and 5° C. and 0.975 gm. of Δ¹,⁴-androstadiene-11β-ol-3,17-dione in 2 cc. of pyridine were introduced. The reaction mixture was allowed to stand five days at 20° C. ±2, then iced one hour. A slight precipitate was formed which was eliminated by vacuum filtering. To the filtrate 105 cc. of toluene were added over twenty minutes under agitation. The agitation was continued for one hour at a temperature between about 0 and +5° C., then the precipitate was vacuum filtered, washed successively with toluene and with petroleum ether, and dried. 0.838 gm. of the raw osminic complex of Δ⁴-androstene-1,2,11β-triol-3,17-dione was obtained.

To the mother liquors were added under the same conditions 105 cc. of petroleum ether. There was obtained a second yield of 1.240 gm. of the raw osminic complex of said compound.

The two precipitates of the raw product were combined and dissolved in 80 volumes of dioxane and the solution was brought to +10° C. Hydrogen sulfide was then slowly introduced over one hour. The sulfur deposit was removed by vacuum filtering and the filtrate was brought to dryness under vacuum.

The raw Δ⁴-androstene-1,2,11β-triol-3,17-dione was dissolved in acetone. The solution was decolored by animal charcoal, brought to dryness, then purified by chromatography on silica gel with elution with methylene chloride containing 20% acetone. The crystals obtained were recrystallized successively, twice from ethyl acetate, then a mixture of acetone and isopropyl ether. Pure Δ⁴-androstene-1,2,11β-triol-3,17-dione was obtained: first melting point was 237° C.±2° and second melting point was 250–251° C., specific rotation $[\alpha]_D^{20} = +191° \pm 7°$ (c.=1% in chloroform).

The compound was soluble in ethanol, benzene, chloroform, acetone and ethyl acetate, insoluble in water, ether and dilute aqueous acids. Dilute aqueous alkalis decomposed it.

*Analysis.*—$C_{19}H_{26}O_5$: molecular weight=334.42. Calculated: C, 68.24%; H, 7.84%. Found: C, 68.3%; H, 7.9%. Ultraviolet spectra (ethanol): λ max. at 240 mμ, ε=12,850.

This compound is not described in the literature.

The starting compound was prepared after the method described by Herzog et al., J. Am. Chem. Soc. 77, 4781 (1955).

*Step B—Preparation of 2-methoxy-Δ¹,⁴-androstadiene-11β-ol-3,17-dione.*—1 gm. of Δ⁴-androstene-1,2,11β-triol-3,17-dione was dissolved in 25 cc. of methanol and nitrogen was bubbled through the solution for twenty to thirty minutes. 16.5 cc. of a solution of sodium methylate in methanol containing 0.44 gm. of sodium per 100 cc. were next introduced and the reaction mixture was heated to reflux under an atmosphere of nitrogen.

After six to seven hours of refluxing the reaction mixture was cooled under nitrogen, then evaporated to dryness under vacuum and under nitrogen.

The gummy residue was triturated several times in anhydrous ether under a current of nitrogen. The powder obtained was the sodium enolate of Δ¹,⁴-androstadiene-2,11β-diol-3,17-dione. The sodium enolate thus obtained was dissolved under nitrogen in 50 cc. of acetone and heated to reflux. 1 cc. of methyl iodide was introduced while maintaining the refluxing under agitation and under nitrogen. Another 1 cc. of methyl iodide was added an hour later. Other lower alkyl halides such as ethyl bromide or ethyl chloride may be used in the place of methyl iodide to form the corresponding 2-alkoxy compound.

At the end of sixty minutes the acetone was distilled off, always under nitrogen and under agitation. The dry residue was taken up in 100 cc. of methylene chloride and 50 cc. of water. The organic layer was separated, washed successively in four cycles, each cycle consisting of 20 cc. of a solution of 10 N sodium hydroxide, followed with water until the wash water was neutralized. The organic solution was dried over magnesium sulfate and evaporated to dryness.

Purification was effected by recrystallization from ethyl acetate in the cold, then by dissolution in acetone, followed by an addition of petroleum ether at elevated temperatures.

0.556 gm. of 2-methoxy-Δ¹,⁴-androstadiene-11β-ol-3,17-dione were obtained, being a yield of 56.2% with reference to Δ⁴-androstene-1,2,11β-triol-3,17-dione, and had melting points of 218 and 220° C.±1°, specific rotation $[\alpha]_D^{20}=+24.5°\pm5°$ (c.=1% in chloroform).

The product was soluble in ethanol, acetone, benzene, chloroform and ethyl acetate, insoluble in water, dilute aqueous acids and alkalis, and ether.

*Analysis.*—$C_{20}H_{26}O_4$: molecular weight=330.41. Calculated: C, 72.69%; H, 7.93%. Found: C, 72.4%; H, 8.0%. Ultraviolet spectra (ethanol): λ max. to 254 mμ, ε=14,100; inflexion to 285 mμ, ε=3,110.

This compound is not described in the literature.

The compounds of the invention are not only useful as antilipemics but are also valuable intermediates of other steroids. For example, 2-methoxy-Δ¹,⁴-androstadiene-11β-ol-3,17-dione may be reduced in the 17-position to form the corresponding 2-methoxy-Δ¹,⁴-androstadiene-11β,17-diol-3-one.

Various modifications of the process and the products of the invention may be made without departing from the spirit or scope thereof, and it is to be understood that the invention be limited only as defined in the appended claims.

We claim:

1. A compound having the formula

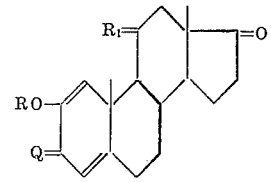

wherein R is a lower alkyl, $R_1$ is selected from the group consisting of =O and

and Q is selected from the group consisting of lower ketals, semicarbazido, hydrazino and oxo.

2. 2-methoxy-Δ¹,⁴-androstadiene-11β-ol-3,17-dione.

3. The 2-sodium enolate of Δ¹,⁴-androstadiene-2,11β-diol-3,17-dione.

4. A process for the preparation of a compound having the formula

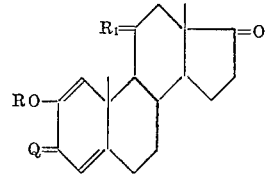

wherein R is a lower alkyl, $R_1$ is selected from the group consisting of =O and

and Q is selected from the group consisting of lower ketals, semicarbazido, hydrazino and oxo, which comprises oxidizing a compound having the formula

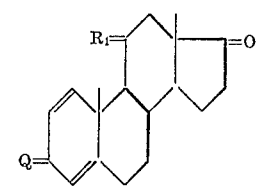

wherein Q and $R_1$ have the above definitions with an osmium oxidizing agent to form a compound having the formula

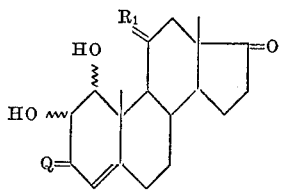

wherein Q and $R_1$ have the above definitions and reacting the latter with an alkali metal alkanolate in a lower alkanol to form a compound having the formula

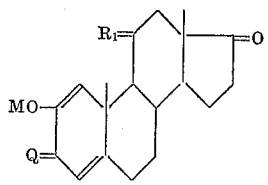

wherein Q and $R_1$ have the above definitions and M is an alkali metal, reacting the latter with a lower alkyl halide to form the corresponding 2-lower alkoxy compound and recovering the desired compound.

5. A process for the preparation of 2-methoxy-$\Delta^{1,4}$-androstadiene-11β-ol-3,17-dione which comprises oxidizing $\Delta^{1,4}$-androstadiene-11β-ol-3,17-dione with an osmium oxidizing agent to form $\Delta^4$-androstene-1,2,11β-triol-3,17-dione, dehydrating said $\Delta^4$-androstene to form a 2-alkali metal enolate of $\Delta^{1,4}$-androstadiene-2,11β-diol-3,17-dione, methylating the latter to form 2-methoxy-$\Delta^{1,4}$-androstadiene-11β-ol-3,17-dione and recovering the latter.

6. The process of claim 5 wherein the oxidation is effected with osmium tetraoxide in pyridine at room temperature.

7. The process of claim 5 wherein the dehydration is effected with sodium methylate in methanol at reflux temperatures.

8. The process of claim 5 wherein the methylation is effected with methyl iodide in an acetone solution at reflux temperature.

9. A process for the preparation of 2-methoxy-$\Delta^{1,4}$-androstadiene-11β-ol-3,17-dione which comprises oxidizing $\Delta^{1,4}$-androstadiene-11β-ol-3,17-dione with osmium tetraoxide in pyridine at room temperature to form $\Delta^4$-androstene-1,2,11β-triol-3,17-dione, dehydrating said $\Delta^4$-androstene with an alkali metal lower alkanolate in a lower alkanol at reflux temperatures to form a 2-alkali metal enolate of $\Delta^{1,4}$-androstadiene-2,11β-diol-3,17-dione, reacting the latter with methyl iodide in an acetone solution at reflux temperatures to form 2-methoxy-$\Delta^{1,4}$-androstadiene-11β-ol-3,17-dione and recovering the latter.

References Cited in the file of this patent

UNITED STATES PATENTS 2,948,740     Baran  ------------------ Aug. 9, 1960